United States Patent
Tartaglione

(10) Patent No.: US 8,040,002 B2
(45) Date of Patent: Oct. 18, 2011

(54) VENTILATED ROTOR OF HIGH-POWER TURBOGENERATOR FOR PRODUCTION OF ELECTRICITY

(75) Inventor: Vincenzo Tartaglione, Arenzano (IT)

(73) Assignee: Ansaldo Energia S.p.A., Genoa (IT)

( * ) Notice: Subject to any disclaimer, the term of this patent is extended or adjusted under 35 U.S.C. 154(b) by 447 days.

(21) Appl. No.: 12/279,369

(22) PCT Filed: Feb. 17, 2006

(86) PCT No.: PCT/IT2006/000083
§ 371 (c)(1),
(2), (4) Date: Dec. 8, 2008

(87) PCT Pub. No.: WO2007/094018
PCT Pub. Date: Aug. 23, 2007

(65) Prior Publication Data
US 2009/0127944 A1   May 21, 2009

(51) Int. Cl.
*H02K 1/32* (2006.01)
*H02K 9/00* (2006.01)
*H02K 9/06* (2006.01)

(52) U.S. Cl. ............ 310/61; 310/64; 310/201; 310/214; 310/215

(58) Field of Classification Search .................... 310/61, 310/64, 201, 214, 215; *H02K 1/32, 9/00, H02K 9/06*
See application file for complete search history.

(56) References Cited

U.S. PATENT DOCUMENTS

| | | | | |
|---|---|---|---|---|
| 2,755,395 A * | 7/1956 | Kilner | ............... | 310/64 |
| 2,787,721 A * | 4/1957 | Tudge | ............... | 310/61 |
| 2,833,944 A * | 5/1958 | Willyoung | ............. | 310/61 |
| 4,634,910 A * | 1/1987 | Schollhorn | ............ | 310/214 |
| 5,685,063 A * | 11/1997 | Prole et al. | .......... | 29/598 |
| 5,777,406 A * | 7/1998 | Bomba et al. | ......... | 310/61 |
| 5,886,434 A * | 3/1999 | Nygard | ............. | 310/61 |
| 6,087,745 A * | 7/2000 | Dreher | ............. | 310/58 |
| 6,774,515 B2 * | 8/2004 | Mori et al. | ........... | 310/61 |
| 2002/0185923 A1 * | 12/2002 | Mori et al. | ........... | 310/61 |
| 2004/0201293 A1 * | 10/2004 | Mayor | .............. | 310/58 |
| 2009/0127944 A1 * | 5/2009 | Tartaglione | ........... | 310/61 |

FOREIGN PATENT DOCUMENTS

| | | |
|---|---|---|
| EP | 0 166 990 | 1/1986 |
| EP | 0 652 623 | 5/1995 |
| EP | 0 889 572 | 1/1999 |
| JP | 2000 299951 | 10/2000 |
| JP | 2000 308293 | 11/2000 |
| WO | WO 00/10750 | 3/2000 |

* cited by examiner

*Primary Examiner* — Quyen Leung
*Assistant Examiner* — John K Kim
(74) *Attorney, Agent, or Firm* — Berenato & White, LLC

(57) ABSTRACT

A ventilated rotor of a high-power turbogenerator for the production of electricity has a shaft extending along an axis; a plurality of axial slots obtained in the shaft; a plurality of conductor bars arranged at least partly in the slots; a plurality of axial channels suitable for ventilating the conductor bars; a plurality of subslots, each of which is arranged below a slot to distribute a ventilating gas; a plurality of axial portions traveled over by respective flows of ventilating gas along each axial channel; and at least one radial channel, which is intended to convey directly the ventilating gas from the sub-slot to the outer surface of the rotor via the conductor bars and is arranged between two consecutive and adjacent axial portions of an axial channel.

19 Claims, 3 Drawing Sheets

VENTILATED ROTOR OF HIGH-POWER TURBOGENERATOR FOR PRODUCTION OF ELECTRICITY

CROSS-REFERENCE TO RELATED APPLICATIONS AND CLAIM TO PRIORITY

This application relates to International Application No. PCT/IT2006/000083 filed Feb. 17, 2006, of which the disclosure is incorporated herein by reference and to which priority is claimed.

TECHNICAL FIELD

The present invention relates to a ventilated rotor of a high-power turbogenerator.

In particular, the present invention relates to a ventilated rotor with two or four poles, with direct ventilation of the rotor electrical winding by ventilating gas, generally air or hydrogen.

BACKGROUND ART

The development of high-power turbogenerators for the production of electricity has evolved with the aim of increasing unitary power, for a given ventilating gas, until reaching maximum dimensions and weight for handling, transport and installation of the turbogenerators.

Therefore, having established the type of ventilating gas and having reached the dimensional limits, increase in performance can be obtained by improving the ventilation methods and, therefore, cooling of the rotor electrical winding. A known ventilation method provides, in a ventilated rotor of a high-power turbogenerator for the production of electricity comprising a shaft extending along an axis, a plurality of axial slots obtained in the shaft, a plurality of conductor bars arranged at least partly in the slots, a plurality of axial channels suitable for ventilating the conductor bars and a plurality of subslots, for the ventilating gas to be distributed by the subslots to the axial channels and expelled from the latter at the level of the outer surface of the rotor.

The ventilated rotor of the type described has the drawback that, in order to increase the power of the turbogenerator, it is necessary to increase the dimensions of the rotor, for example the length, consequently lengthening the axial channels and increasing the temperature of the conductor bars.

In order not to exceed the temperatures established by the current regulations, increase in the length of the axial channels must be accompanied by an appropriate reduction in the losses per unit of length and, therefore, in the rotor current. This means that the specific power that can be delivered by the generator in terms of MVA/m$^3$ (power of the generator/volume of active parts) decreases as the dimensions increase. In other words, the increase in power of the turbogenerator is not directly correlated with the increase in dimensions.

DISCLOSURE OF INVENTION

The object of the present invention is to produce a ventilated rotor of a high-power turbogenerator intended to optimise and increase the ventilation necessary for cooling the electrical winding of the rotor in order to contain the mean value and maximum value of the temperature within the limits prescribed by the current regulations also for rotor of large dimensions.

At the same time, a further object of the present invention is to solve the preceding object simply and inexpensively.

According to the present invention a ventilated rotor of a high-power turbogenerator for the production of electricity is provided comprising a shaft extending along an axis; a plurality of axial slots obtained in the shaft; a plurality of conductor bars arranged at least partly in the slots; a plurality of axial channels suitable for ventilating the conductor bars; and a plurality of subslots, each of which is arranged below a slot to distribute a ventilating gas; the rotor being characterised by comprising along each axial channel a plurality of axial portions traveled over by respective ventilating gas flows; and at least one radial channel which is suitable for conveying directly the ventilating gas from the subslot to the outer surface of the rotor through the conductor bars and is arranged between two consecutive adjacent axial portions of an axial channel.

According to the present invention the conductor bars are ventilated mainly by the axial channels divided into portions in which each portion is traveled over by a respective flow. The more each axial channel is divided into consecutive adjacent portions, the greater the ventilation efficiency. The radial channel that directly connects the subslot to the outer surface of the shaft is arranged between two consecutive adjacent portions of an axial channel in order to produce a ventilation concentrated in a particularly critical area in terms of overheating.

According to a preferred embodiment of the invention each axial channel is divided into at least six axial portions, each of which is supplied with a respective ventilating gas, each axial portion discharging the ventilating gas to the outside of the rotor.

A high number of axial portions, greater than or equal to six, permits the creation of relatively short axial portions, therefore able to provide more efficient ventilation also in relatively long rotors.

According to a further preferred embodiment of the present invention the radial channel is arranged at the level of the median part of the shaft.

In other words, the central area of the shaft is identified as the most critical area from the thermal point of view.

BRIEF DESCRIPTION OF THE DRAWINGS

For a better understanding of the present invention, a preferred embodiment will be described below, purely as a non-limiting example and with reference to the attached figures, in which.

BEST MODE FOR CARRYING OUT THE INVENTION

Figure 1:
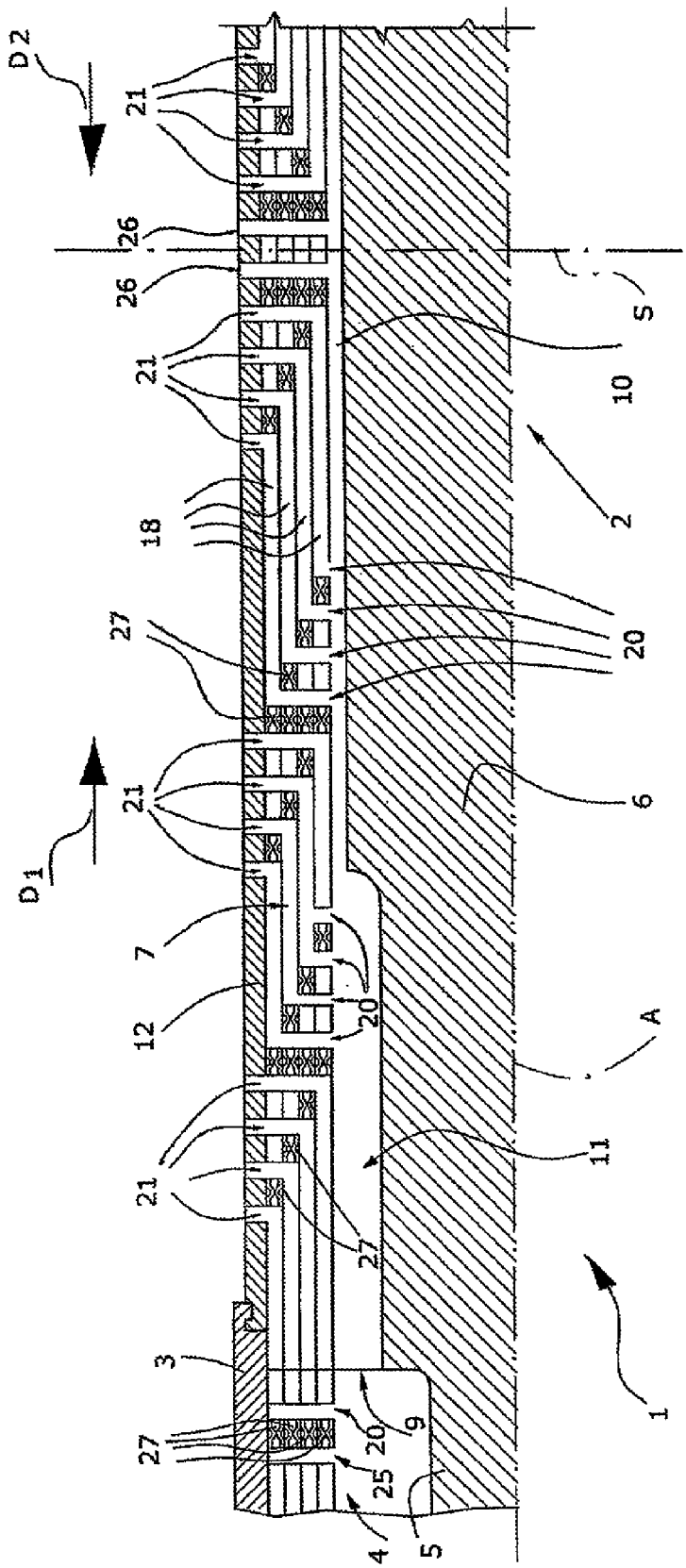
FIG. 1 is a schematic view in longitudinal section, with parts removed for clarity, of a portion of a rotor of a turbogenerator according to the present invention.

With reference to FIG. 1, 1 indicates, as a whole, a rotor of a turbogenerator. The rotor 1 extends along an axis A and has a specular symmetry with respect to a plane of symmetry S. The rotor 1 comprises a shaft 2; two end rings 3 (only one of which is illustrated in FIG. 1); and electric windings 4. The shaft 2 is made of steel and has two end journals 5 (only one of which is illustrated in FIG. 1) and a central body 6, in which slots 7 are provided which extend throughout the length of the central body 6 and are intended to house a part of the electrical winding 4. In practice, each electrical winding 4 extends along a closed circuit which comprises two straight portions, each of which are arranged in a respective slot 7, and two U-shaped portions, each of which is joined to the two straight portions and is arranged between a journal 5 and a respective ring 3 in an area of the rotor 1 which is normally defined as the head.

The central body 6 has subslots 9, each of which extend below a corresponding slot 7 throughout the length of the central body 6 in an axial direction, the function of which is to convey and distribute a ventilating gas which is generally air or hydrogen. Each subslot 9 has a central portion 10 and two end portions 11, which have a cross section greater than the cross section of the central portion 10. In the case illustrated in FIG. 1, the reduction of the cross section of the subslot 9 is determined by a reduction in the height of the subslot 9 (measured in a radial direction), the other dimensions being equal, it being understood that the reduction of the cross section can be obtained also according to other embodiments not illustrated in the attached figures.

Figure 2:
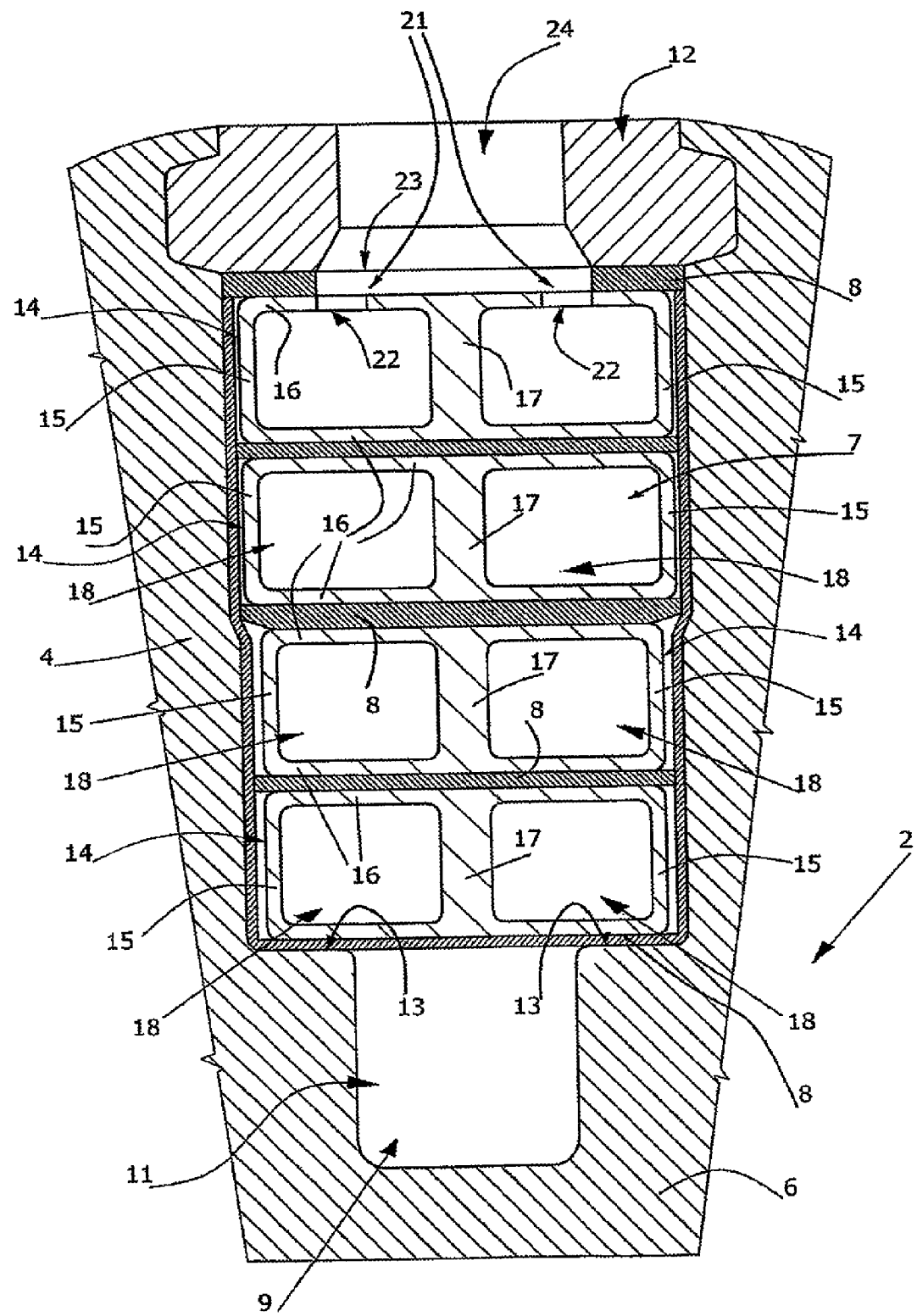
FIG. 2 is a cross section view, on an enlarged scale and with parts removed for clarity, of the rotor of FIG. 1.

With reference to FIG. 2, each slot 7 is occupied by the electrical winding 4 and a key 12 which extends parallel to the axis A and is intended to be coupled with the portion of slot 7 near the outer surface of the central body 6 (of the shaft 2 or the rotor 1 respectively) to block the electrical winding 4 inside the slot 7. In fact, the cited portion of the slot 7 and the key 12 are shaped so as to produce a prismatic coupling. The slot 7 communicates directly with the subslot 9 below, which forms with the slot 7 two shoulders 13, on which the electrical winding 4 rests with a strip 3 of insulating material positioned in-between. In other words, the subslot 9 has a width less than the width of the slot 7 in which width indicates a dimension measured in a direction perpendicular to the radial direction. The strip 8 of insulating material is particularly broad and flexible so as to cover also the side walls of the slot 7.

Figure 3:
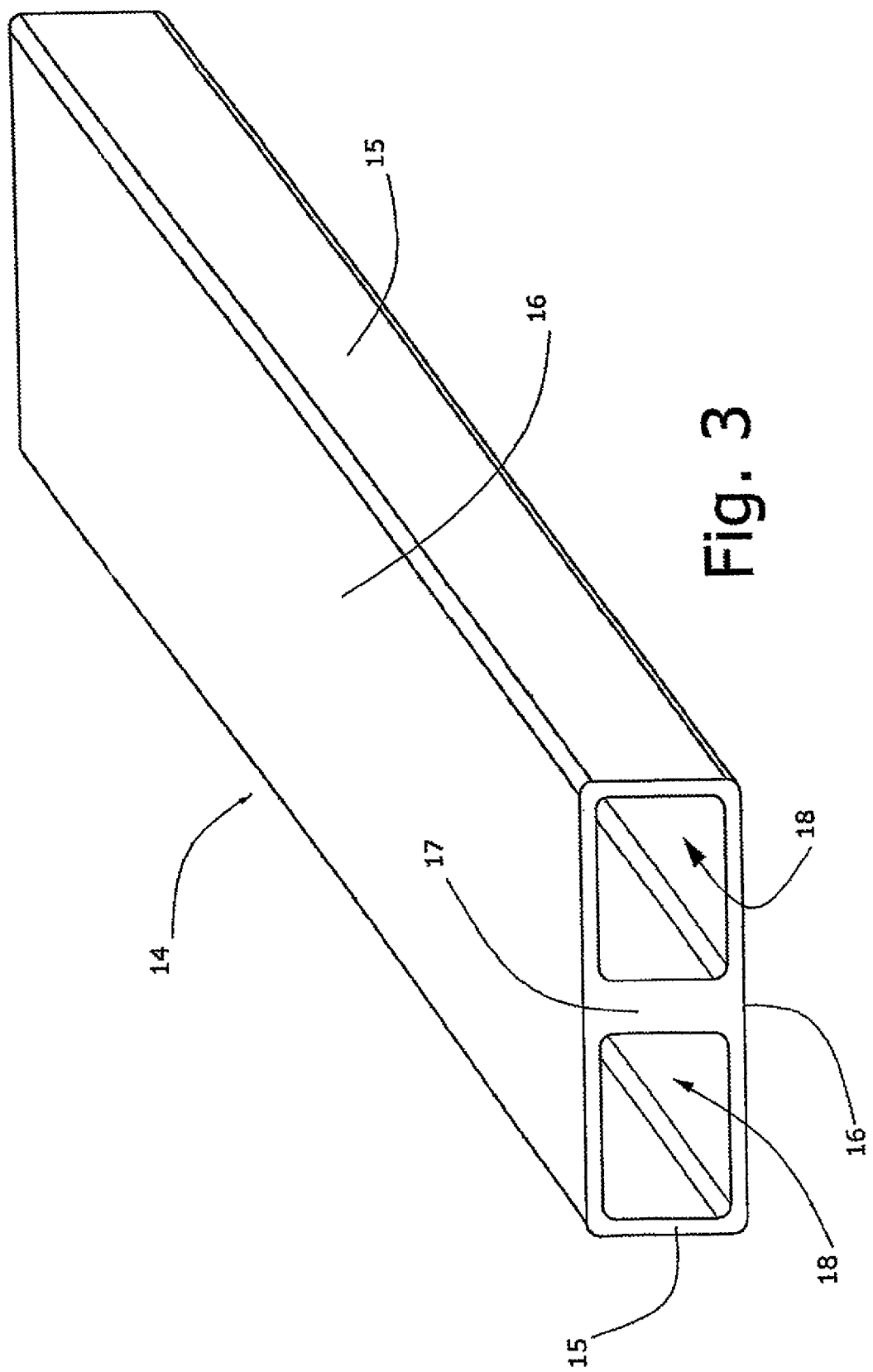
FIG. 3 is a perspective view, on a further enlarged scale and with parts removed for clarity, of a detail of the rotor of FIG. 1.

The electrical winding 4 comprises a bundle of conductor bars 14, in the figure four conductor bars 14 are shown positioned on top of one another, but each electrical winding 4 can consist of any number of conductor bars 14. With reference to FIG. 3, each conductor bar 14 is defined by a hollow copper tube with a rectangular cross section. Each conductor bar 14 is delimited by two shorter walls 15 and two longer walls 16 and has an internal partition 17 parallel to the shorter walls 15 so as to form two parallel channels 18 in each conductor bar 14.

According to an alternative embodiment not shown, each conductor bar 14 is without the partition 17 and consequently forms one single channel 18.

According to a further embodiment not illustrated of the present invention, the conductor bars can have any cross section.

In the portion in which the conductor bars 14 are housed in corresponding slots 7 and in the end portions adjacent to the slots 7, the conductor bars 14 extend parallel to the axis A of the shaft 2 and, consequently, the channels 18 are parallel to the axis A; for this reason, they will be defined below as axial channels 18. Each conductor bar 14 extends along a closed circuit path formed by two straight portions and two U-shaped portions arranged at the level of the opposite heads in which U-shaped channels are present.

The function of the axial channels 18 is to convey the ventilating gas inside the conductor bars 14 and reduce the temperature of the electrical winding 4. Analogously also the U-shaped channels are supplied with ventilating gas.

With reference to FIG. 2, the electrical winding 4 comprises, in addition to the bars 14 positioned on top of one another along the walls 16 and the strip 8 of insulating material between the conductor bar 14 and the shoulder 13, further strips 8 of insulating material to separate each conductor bar 14 from the adjacent conductor bars 14 and from the key 12.

The rotor 1 is a component of a turbogenerator, which has a ventilation device, of known type and not illustrated and which provides ventilation of the entire turbogenerator by means of fans for recirculation of the ventilating gas and equipment for cooling the ventilating gas. In other words, the ventilation device creates a direct flow of gas from the heads towards the median part of the rotor 1 inside the subslots 9 and the pressurised and depressurised areas at the level of the outer surface of the rotor 1. To avoid all misunderstandings, it is specified that in the present description the definition "median part" of the rotor 1 or shaft 2 refers to the portion of the rotor 1 (of shaft 2 respectively) positioned near the plane of symmetry S.

The ventilating gas is supplied to the axial channels 18 and from the latter discharged along the outer face of the rotor 1 into underpressure areas.

Each axial channel 18 is connected to a supply channel 20 and to an outlet channel 21 of the ventilating gas. Each supply channel 20 is defined by at least one aperture 22 and by at least one aperture 23 in the strips 8 of insulating material (not illustrated in the attached figures). The apertures 22 are obtained in the longer walls 16 of the conductor bars 14. The longer supply channels 20 are provided with apertures 22 and 23 which, although not identical, are positioned on top of each other at least partly in a radial direction. With reference to FIG. 2, each outlet channel 21 is defined by at least one aperture 22 obtained in the longer walls 16 of the conductor bars 14 and by at least one aperture 23 in the strips 8 of insulating material. In the example illustrated in FIG. 2, each conductor bar 14 has two apertures 22 side by side so as to form two outlet channels 21 from the respective axial channels 18. The overlying strip 8 of insulating material comprises one single aperture 23 positioned above the two apertures 22. The key 12 has, in turn, an aperture 24, which is of smaller dimensions than the aperture 23 below and has a flared lower portion connecting with the aperture 23. Essentially, the two outlet channels 21 positioned side by side converge towards one single aperture 24 in the key 12.

Each axial channel 18 is divided into six straight portions, each of which is crossed by a respective flow of ventilating gas supplied by a supply channel 20 which extends in a substantially radial direction and is expelled by the rotor 1 via an outlet channel 21 extending in a substantially radial direction. In the example illustrated in FIG. 1, the electrical winding 4 has four conductor bars 14, each of which has two axial channels 18 for a total of eight axial channels 18 for each slot 7. The axial channels 18 are in turn divided into six portions each for a total of forty-eight portions of axial channel 18 in each slot 7. In the same way forty-eight outlet channels 21 are necessary divided into six groups and concentrated so as to discharge into the underpressure areas at the level of the outer surface of the rotor 1. As the axial channels 18 are positioned on top of one another, the outlet channels 21 are axially offset from each other so as to obtain a two-way relation between each axial channel 18 and the corresponding outlet channel 21.

With reference to supply of the ventilating gas to the axial channels 18, FIG. 1 shows supply channels 20, which are arranged at the level of the heads. Unlike the outlet channels 21, each head supply channel 20 simultaneously supplies four adjacent axial channels 18 positioned on top of one another. At the head, supply channels 25 are also positioned intended to supply the ventilating gas to curved channels provided in the conductor bars 14 and adjacent to the axial channels 18.

Alternatively, the head supply channels 20 could be offset with respect to each other so as to obtain a two-way correspondence between each supply channel 20 and a corresponding axial channel 18. The remaining supply channels 20 that connect the subslot 9 to the axial channels 18 are axially offset from each other as described for the outlet channels 21.

If the conductor bars 14 positioned on top of one another are particularly numerous according to a variation not illustrated in the attached figures, each supply channel 20 and each outlet channel 21 is connected to several axial channels 18 so as to prevent the area involved in exchange of the ventilating gas in the axial channels 18 becoming oversized in an axial direction.

According to the preceding description, frequent exchange of the ventilating gas flowing in the axial channels 18 is performed and therefore the capacity to lower the temperature of the electrical winding 4 is increased.

The rotor 1 has, furthermore, in each slot 7, radial channels 26, which provide for direct communication of the subslot 9 with the outer surface of the rotor 1. Each radial channel 26 consists of apertures 22 obtained in the conductor bars 14, and apertures 23 obtained in the strips B of insulating material. The radial channels 26 discharge on the outside of the rotor via the apertures 24 of the key 12. The radial channels 26 are positioned near the outlet channels 21 so that they discharge onto the outer surface of the rotor 1 in an underpressure area and between two consecutive adjacent portions of an axial channel 18.

In FIG. 1 the radial channels 26 are positioned in the median part of the rotor 1, which is the area farthest from the heads and is the area where the ventilating gas arrives at a higher temperature with respect to the temperature of the ventilating gas at the level of the heads. The direct connection between the subslot 9, in which the ventilating gas remains at a relatively low temperature, and the outside of the rotor 1 via the radial channels 26 permits ventilation which reduces the temperature of the electrical winding 4 in a concentrated area which is particularly critical in terms of overheating.

The distribution of the ventilating gas in each axial channel 18 is regulated by means of occlusions 27 obtained in each axial channel 18 and by the supply channels 20 and the outlet channels 21 as described previously. Each occlusion 27 is obtained by plastic deformation of the conductor bar 14. In the case in point, small facing portions of longer walls 16 of a conductor bar 14 are plastically and locally deformed until said facing portions are in contact with each other so as to occlude the axial channel 18.

With reference to FIG. 1, the occlusions 27 have the function of isolating the supply channels 20 and the outlet channels 21, which intersect the axial channels 18, from the axial channels 18. Analogously, also the radial channels 26 intersect the axial channels 18 and are isolated from the latter by a series of occlusions 27 so as to concentrate the ventilating action solely in the areas immediately adjacent to the radial channels 26.

In use and with reference to FIG. 1, the ventilating gas is supplied from the opposite heads towards the median part of the rotor 1 in the directions D1 and D2. At the level of each head, the ventilating gas enters, partly, the supply channels 20 and supplies the first portions of axial channel 18 and is subsequently discharged through the outlet channels 21 and partly into the subslot 9. The subslot 9 supplies the supply channels 20 which, in turn, supply second and third portions of axial channels 18, and the radial channels 26. Discharge of the ventilating gas through the outlet channels 21 is aided not only by the underpressure areas into which said outlet channels discharge, but also by rotation of the rotor around the axis A which determines the so-called self-ventilation.

The rotor 1 permits reduction of the mean value of the temperature of the electrical winding 4 with respect to the known rotors with the same copper conductor portion, rotor current intensity, ventilating gas type and ventilating gas pressure. Alternatively the rotor 1 permits compliance with the current regulations in terms of temperature of the electrical winding 4 with current values and/or rotor length greater than the known rotors. Furthermore, the rotor 1 is able to reduce the ratio between the maximum temperature and the mean temperature of the electrical winding 4. This fact results in improved utilisation of the electrical winding 4 and permits compliance with the current regulations, which require the avoidance of "hot points" that could limit the capacity of the electrical winding 4 of the rotor 1 in terms of ampere turns.

The present invention provides for a plurality of alternative embodiments not illustrated in the attached figures. Of the latter it should be remembered, for example, that the supply channels 20 and 25 arranged at the level of the heads can be replaced by apertures in the shorter walls 15 of the conductor bars 14.

According to an embodiment not illustrated in the attached figures, the radial channels 26 are arranged also between the supply channels 20 and the outlet channels 21.

The invention claimed is:

1. A ventilated rotor of a high-power turbogenerator for the production of electricity, comprising:
    a shaft extending along an axis;
    a plurality of axial slots provided in the shaft;
    a plurality of conductor bars arranged at least partly in the axial slots;
    a plurality of axial channels suitable for ventilating the conductor bars;
    a plurality of subslots each arranged below one of the axial slots to distribute a ventilating gas;
    a plurality of axial portions provided along each of the axial channels and travelled over by respective ventilating gas flows; and
    at least one radial channel provided for directly conveying the ventilating gas from the subslot to an outer surface of the rotor the and arranged between two consecutive adjacent axial portions of the axial channels;
    the radial channel intersecting the axial channels and isolated therefrom by a series of occlusions so as to concentrate the ventilating action solely in areas immediately adjacent to the radial channel.

2. The rotor as claimed in claim 1, wherein each axial channel is divided into at least six axial portions each of which is supplied by a respective ventilating gas flow, each axial channel discharges the ventilating gas to the outside of the rotor.

3. The rotor as claimed in claim 1, wherein each axial channel has at least three consecutive portions in which the ventilating gas flow is directed towards the median part of the shaft in a first direction and at least three consecutive portions in which the ventilating gas flow is directed towards the median part of the shaft in a second direction opposite the first direction.

4. The rotor as claimed in claim 1, wherein the radial channel is positioned at the level of the median part of the shaft.

5. The rotor as claimed in claim 1, comprising a plurality of radial channels arranged between two consecutive adjacent portions of each axial channel (18) at the level of the median part of the shaft.

6. The rotor as claimed in claim 1, wherein each conductor bar is defined by a hollow tube; each axial channel is positioned inside the conductor bar.

7. The rotor as claimed in claim 5, wherein each conductor bar has a rectangular cross section and is delimited by two shorter walls and two longer walls.

8. The rotor as claimed in claim 6, wherein each conductor bar is defined by a hollow tube having two adjacent parallel cavities; each conductor bar encloses a pair of the adjacent parallel axial channels.

9. The rotor as claimed in claim 8, wherein each conductor bar has a rectangular cross section and is delimited by two shorter walls, two longer walls and a partition.

10. The rotor as claimed in claim 6, wherein each axial channel has the occlusions to interrupt the axial flow of the ventilating gas.

11. The rotor as claimed in claim 10, wherein each occlusion is obtained by means of a local plastic deformation of the conductor bar.

12. The rotor as claimed in claim 1, further comprising supply channels for feeding the ventilating gas to the portions of the axial channels and outlet channels for discharging the ventilating gas from the portions of the axial channels.

13. The rotor as claimed in claim 12, wherein each supply channel is defined by at least one first aperture obtained through the conductor bar.

14. The rotor as claimed in claim 12, wherein each outlet channel is defined by at least one first aperture obtained through the conductor bar.

15. The rotor as claimed in claim 14, further comprising a key (12) for blocking the conductor bars in the respective axial slot (7), each key comprises a plurality of second apertures into which the outlet channels discharge.

16. The rotor as claimed in claim 1, wherein the shaft comprises a central body (6) extending between the opposite heads of the rotor; the subslot (9) extends throughout the axial length of the central body connecting the two opposite heads.

17. The rotor as claimed in claim 15, wherein the subslot has a central portion and two end portions, which have a greater cross section than the cross section of the central portion.

18. A ventilated rotor of a high-power turbogenerator for the production of electricity, comprising:
   a shaft extending along an axis;
   a plurality of axial slots provided in the shaft;
   a plurality of conductor bars arranged at least partly in the axial slots;
   a plurality of axial channels provided for ventilating the conductor bars;
   a plurality of subslots each arranged below one of the axial slots to distribute a ventilating gas;
   a plurality of axial portions provided along each of the axial channels and travelled over by respective ventilating gas flows; and
   at least two radial channels provided for directly conveying the ventilating gas from the subslots to an outer surface of the rotor and arranged between two consecutive adjacent axial portions of the axial channels at the level of the median part of the shaft;
   the radial channels intersecting the axial channels and isolated therefrom by a series of occlusions so as to concentrate the ventilating action solely in areas immediately adjacent to the radial channels.

19. A ventilated rotor of a high-power turbogenerator for the production of electricity, comprising:
   a shaft extending along an axis;
   a plurality of axial slots provided in the shaft;
   a plurality of conductor bars arranged at least partly in the axial slots;
   a plurality of axial channels suitable for ventilating the conductor bars;
   a plurality of subslots each arranged below one of the axial slots to distribute a ventilating gas;
   a plurality of axial portions provided along each of the axial channels and travelled over by respective ventilating gas flows; and
   at least two radial channels provided for directly conveying the ventilating gas from the subslots to an outer surface of the rotor and arranged between two consecutive adjacent axial portions of the axial channels at the level of the median part of the shaft;
   the radial channels intersecting the axial channels and isolated therefrom by a series of occlusions so as to concentrate the ventilating action solely in areas immediately adjacent to the radial channels;
   the shaft comprising a central body extending between opposite heads of the rotor;
   the subslots extending throughout the axial length of the central body, connecting the two opposite heads and including a central portion and two end portions having a greater cross section than the cross section of the central portion.

* * * * *